United States Patent Office 3,595,679
Patented July 27, 1971

3,595,679
TREATMENT OF BACON BELLIES
Walter S. Schoch, Western Springs, and Reese G. Lewis, Itasca, Ill., assignors to Armour and Company, Chicago, Ill.
No Drawing. Continuation of application Ser. No. 590,463, Oct. 31, 1966. This application Jan. 15, 1970, Ser. No. 4,169
Int. Cl. A23b 1/00, 1/04
U.S. Cl. 99—159         4 Claims

ABSTRACT OF THE DISCLOSURE

An improved process for preparing sliced bacon comprising the steps of curing and smoking bacon bellies in the presence of an edible polyphosphoric acid salt of an alkali metal, controlling the moisture content of the bellies so that the smoked and chilled weight thereof is less than about 103% of their green weight, and then slicing the bellies with a high-speed rotary slicing blade operating at a speed between 800–1400 revolutions per minute.

---

This application is a continuation of application Ser. No. 590,463 filed Oct. 31, 1966, now abandoned.

This invention relates to a process for preparing an improved bacon product, and more particularly to a process in which bacon bellies are cured in the presence of certain edible phosphates and then further processed to provide an improved product.

In conventional meat packinghouse operations, sliced bacon is produced by a method which involves curing bacon bellies, holding in a smokehouse under controlled conditions until a proper "finish" is obtained, and then chilling, tempering, forming, slicing, grading, and packaging the sliced bacon in consumer-size packages. The meat industry has long been faced with a well-recognized but unsolved problem in regard to the slicing step which is included in the sequence just described. In the case of most bacon bellies processed in this manner, there is usually an undesirably high quantity of bacon slices which are damaged in the slicing operation and which must be assigned a lower grade and therefore sold at a lower price. This contributes to a substantial loss in the so-called "slicing yield" but has long come to be accepted as a necessary evil in the operation, apparently caused by the difficult combination of fat and lean tissue present in pork bellies. The slicing operation is usually carried out with a high speed rotary blade slicing machine which operates at speeds within the range of about 800–1400 revolutions per minute, and the extreme conditions of pressure and friction resulting from the use of such equipment ordinarily will cause damage to as much as 15 to 20% of the bacon.

It has been recognized for some time that other pork products such as hams and picnics may be improved by adding certain molecularly dehydrated phosphates to the curing pickle and substantially increasing the moisture content of the finished ham or picnic, thus obtaining a product having a greatly-improved tenderness and juiciness. Hams and picnics treated in this manner reach their optimum degree of improvement with about 8 to 12% of added moisture, which is made possible by the use of phosphates in the curing solution. The practices theretofore taught in connection with the use of phosphates in hams and picnics, however, have not been applicable to the "slicing yield" problem which has existed in the case of bacon bellies, and in fact if the phosphate curing techniques of the ham and picnic art had been applied to bacon bellies, the higher moisture levels would in fact have aggravated rather than solved the slicing yield problems incurred in the bacon art.

We have discovered a treatment for bacon bellies whereby the slicing yields are substantially improved. The treatment involves curing the bellies in the presence of a small amount of polyphosphate within the limits set out hereinbelow and controlling the amount of moisture taken up by the bellies during the curing and subsequent steps so that the amount of added moisture does not exceed 3%, based on the weight of the meat, at the time the bellies are subjected to the high speed slicing operation. We have found that the combination of adding polyphosphate and controlling the moisture content has an unexpected conditioning effect on the texture and firmness of both the protein and fat components of the bacon bellies, resulting in a substantial improvement in sliceability and a substantial increase in the number of premium grade slices obtainable from a bacon belly. At the same time, the new treatment provides additional unexpected improvements, such as a decrease in the amount of spattering and shrinkage of the bacon slices upon frying, and substantial reductions in chilling times. Further reference to such advantages will be made as the specification proceeds.

The invention may be described generally as a process for preparing an improved bacon product comprising the steps of curing and smoking bacon bellies in the presence of an edible polyphosphoric acid salt of an alkali metal, controlling the moisture content of the said bellies so that the smoked and chilled weight thereof is less than about 103% of their green weight (i.e. their weight prior to curing) and slicing said bellies with a high speed rotary slicing blade operating at a speed between about 800–1400 revolutions per minute.

In carrying out the process of the present invention, bacon bellies which are obtained in the conventional manner in the break-up of hog carcasses are preferably treated with a curing composition containing the edible polyphosphate. Bacon bellies ordinarily weigh in the range of 8 to 18 pounds, depending upon the size of the hogs from which they are obtained, and may be from ¾–2½″ thick and from 8–12″ wide. They are ordinarily cured by pumping them with an aqueous cure solution (brine) containing salt, brown sugar, soluble nitrite salts, and a small amount of an approved color-enhancing chemical compound. The pumping procedure is carried out by the use of an apparatus having a plurality of hollow needles which are inserted into the bacon slab and through which the curing pickle is pumped into the slab.

The exact composition of the curing pickle is not a critical element in the practice of the present invention, but the pickle does in fact provide a convenient vehicle for introducing the polyphosphate into the body of the bacon slab. The objective is to incorporate in the meat approximately 0.1 to 1.0% polyphosphate, based on the weight of the meat, and it has been found that this can readily be accomplished by adding approximately 1 to 10% by weight of polyphosphate to the curing pickle and then pumping the bacon belly with from 9 to 12% by weight of the pickle. Since a substantial quantity of the moisture thus introduced into the meat is later removed in the smokehouse processing, and since it is an important element of the present invention that the added moisture does not exceed 3% by weight, it is necessary in the practice of the invention that the amount of pickle initially pumped into the bacon bellies be coordinated with the conditions in the smokehouse to arrive at a smoked and chilled weight not exceeding 103% of the green weight. Although introducing the phosphate into the meat through the medium of the pumping pickle is preferred in the present invention, it will be recognized that other methods for curing and for introducing the phosphate can be utilized and are intended to be included in the scope of the invention.

The phosphate salt to be used in the practice of the invention may be any edible phosphoric acid salt of an alkali metal. Generally speaking, the phosphate salt may be any of the molecularly dehydrated sodium or potassium phosphates having the general formula $M_2O \cdot P_2O_5$ in which M is an alkali metal particularly sodium or potassium, and in which the molar ratio of $M_2O$ to $P_2O_5$ is in the range of about 1:1 to about 2:1. Specific examples of phosphate salts which may be used in the invention are sodium tripolyphosphate ($Na_5P_3O_{10}$), sodium hexametaphosphate ($NaPO_3)_6$, tetrasodium pyrophosphate $$(Na_4P_2O_7)$$

tetrapotassium pyrophosphate ($K_4P_2O_7$), potassium tripolyphosphate ($K_5P_3O_{10}$), and mixtures thereof.

Following the step of injecting or otherwise introducing the curing pickle containing the polyphosphate, the bacon bellies are drained for a period of time, combed and hung on trees in the conventional packinghouse manner, and then placed in heated, smoke-laden currents of air in a smokehouse. During the smoking operation it is possible to carry out the objectives of the invention by using conventional smokehouse temperatures, times, and other conditions, for example, in one such conventional procedure, the cured bacon bellies are placed in a smokehouse at a temperature of 130–135° F. and held there until the internal temperature of the meat reaches about 126–128° F. which will ordinarily require four to five hours in the ordinary air-conditioned smokehouse. The temperature of the house is then lowered, to about 130° F., and held for about another eight hours until the bellies are properly finished. The term "finished," as used in the bacon belly smoking industry, is a word of art indicating that the bellies have reached the stage where they are completely cured, stabilized with the respect to color, no longer raw, and have the proper firmness. When the bellies have reached this stage and the moisture content has been stabilized at a level to provide a smoked and chilled weight below 103% of the green weight, the bellies are "pulled" from the smokehouse and are ready, after chilling, tempering, and molding for the succeeding slicing step. It will be recognized that the smoking step in the practice of the invention can be carried out utilizing conventional smokehouses—either air-conditioned or of the so-called stack house type—and employing other conventional times, temperatures and other conditions and techniques.

Following the smoking step, the bellies are chilled in the ordinary manner in a bacon chill freezer until the internal temperature is in the neighborhood of 24–26° F. An advantage of the invention, however is that bacon bellies cured with phosphate as above described need to be tempered for a substantially shorter period of time following the chilling step, as compared with the ordinary practice. Whereas in the conventional process the chilling and tempering steps require 48 to 72 hours in order to achieve proper surface drying and firming up prior to molding, it has been found that this procedure requires only about half the above time in the case of the phosphate treated bacon bellies.

After chilling, the bellies are subjected to pressure in a molding box or machine of conventional design and operation, the purpose of the molding step being to square up the slab so that the slices obtained in the subsequent slicing operation will be as uniform as possible. The bellies are then sliced on high speed, rotary blade slicing machines, operating at speeds of 800–1400 revolutions per minute, and the resulting slices are graded and packaged according to conventional practice.

As previously indicated, the practice of the invention as described above provided a substantial improvement in slicing yields obtainable from the treated bellies. Extensive tests have shown that it is possible through use of the invention to achieve an increase of from 2 to 5% in the quantity of No. 1 grade slices from any particular belly. Further, it is possible to obtain an overall increase of .5 to 1% in the total number of usables slices from a belly. Since the total federally inspected tonnage of sliced bacon in the United States is currently in excess of 1,150,000,000 pounds annually, a .5% improvement in slicing yield means that use of the invention can result in an increase of more than 5,750,000 pounds of bacon which can go into slices rather than ends and pieces for sausage material; and added to this is the fact that 2 to 5% more of the total production can be of No. 1 grade.

In addition to the improvement in slicing yields, it has been found that the present invention also provides the following advantages:

(1) Bacon slices treated as herein described spatter to a noticeably lesser degree upon frying. The slices also separate more readily, and they shrink less and lie flatter when cooking.

(2) As previously described, it is possible in the practice of the invention to shorten the tempering step prior to forming and slicing in the treatment of the bacon bellies. This shortens the manufacturing time by 48 to 72 hours and also reduces the amount of cooler space formerly needed.

Specific examples illustrating the invention are as follows:

EXAMPLE 1

One packinghouse vat of blockstock 12–14 lb. average bacon bellies were injection pumped with 7% of (1) regular I.N.A. pumping pickle and (2) I.N.A. pumping pickle containing 5% by weight of sodium tripolyphosphate. (The I.N.A. pumping pickle consists of 134 lb. sodium chloride, 30 lb. soft brown sugar, and 1.5 lb. sodium nitrite per 100 gallons of finished pickle.) The bellies of both lots were then held for 6 days in a covering pickle containing 70 lb. of sodium chloride and 1.0 lb. of sodium nitrite, then drained, combed and smoked in an air-conditioned smokehouse for 21 hours at 135° F., and finally chilled, formed, sliced, and graded. The results are tabulated as follows:

|  | Lot No. 1 (Control) | Lot No. 2 (Tri-polyphosphate) |
| --- | --- | --- |
| Type cure | I.N.A. | I.N.A. and sodium tri-polyphosphate |
| Pump percentage | 6.99 | 6.98 |
| Yield from green weight to smoked chilled weight | 95.0 | 95.48 |
| Slicing yield (No. 1 grade) | 70.63 | 82.92 |

Cartons of sliced bacon of both lots were held for 10 days at 40° F. At the end of this time, there was no discoloration in the bacon of either lot, and the flavor of both lots was acceptable. However, the bacon in the phosphate lot was brighter and better appearing than that in the control lot.

EXAMPLE 2

Three vats of 12–14 lb. average slicing bellies were injection pumped with (1) 7% of regular I.N.A. pickle and (2) 7% of I.N.A. pickle containing 5% by weight of sodium tripolyphosphate. The two lots were covered for 5 days with a pickle containing 70 lb. sodium chloride and 1.0 lb. sodium nitrite per 100 gallons of finished pickle, and then smoked together in the same smokehouse at 135° F. The results of pumping, curing, smoking and slicing were:

|  | Lot No. 1 (Control) | Lot No. 2 (Tri-polyphosphate) |
| --- | --- | --- |
| Type cure | I.N.A. | I.N.A. and sodium tri-polyphosphate |
| Pump, percent | 7.6 | 7.7 |
| Yield from green to smoked chilled weight, percent | 93.41 | 94.79 |
| Slicing yield No. 1 grade, percent | 82.1 | 90.3 |

Samples of each lot were submitted to chemical analysis, with the following results:

| Cure | Percent | | | |
|---|---|---|---|---|
| | Moisture | Salt | Nitrate | $P_2O_5$ |
| Control | 29.5 | 1.7 | 56 | 0.23 |
| | 22.8 | 1.0 | 46 | 0.27 |
| | 24.8 | 0.9 | 38 | 0.26 |
| Average | 25.6 | 1.2 | 47 | 0.26 |
| 5% sodium tripolyphosphate | 28.8 | 1.8 | 60 | 0.51 |
| | 17.5 | 1.0 | 44 | 0.32 |
| | 20.4 | 0.8 | 30 | 0.29 |
| Average | 22.2 | 1.2 | 44 | 0.37 |

The flavor and color stability of both lots were very good. However, after holding for 3 weeks, the control bacon developed a few molds, while there were none on the tripolyphosphate-cured bacon.

EXAMPLE 3

Four lots of 11–13 lb. skinless slicing bellies, of approximately 500 lbs. each, were pumped and cured as follows:

Lot #1—Pumped 10% with regular I.N.A. pickle, held for 2 hours, then smoked for 17 hours at 125° F. in an air-conditioned smokehouse.

Lot #2—Pumped 10% with regular I.N.A. pickle containing 5% of sodium tripolyphosphate, held for 2 hours, and then smoked with Lot #1.

Lot #3—Pumped 7% with regular I.N.A. pickle, covered with I.N.B. pickle (i.e. pickle containing 70 lb. sodium chloride and 1.0 lb. sodium nitrite per 100 gallons of finished pickle) for 5 days, then smoked for 20 hours at 135° F. in an air-conditioned smokehouse.

Lot #4—Pumped 7% with regular I.N.A. pickle containing 5% of sodium tripolyphosphate, covered with I.N.B. pickle for 5 days, then smoked with Lot #3 for 19 hours at 135° F.

After chilling for 24 hours, the bellies were held for 48 hours in the tempering room before being molded and sliced. The results of the curing, smoking and slicing were as follows:

| | Lot Number | | | |
|---|---|---|---|---|
| | 1 | 2 | 3 | 4 |
| | Purpose | | | |
| | Control | Test | Control | Test |
| Pickle used | I.N.A. | I.N.A. and phosphate | I.N.A., I.N.B. | I.N.A. and phosphate I.N.B. |
| Percent pumped | 10.6 | 9.2 | 5.62 | 7.1 |
| Time in cure, hours | 2 | 2 | (¹) | (¹) |
| Yield from green to molded weight, percent | 98.19 | 97.4 | 97.12 | 96.52 |
| Slicing yield of No. 1 grade slices, percent | 85.01 | 89.9 | 88.13 | 91.18 |
| Yield of No. 1 grade sliced bacon from green weight, percent | 83.0 | 87.56 | 85.59 | 88.01 |

¹ 5 days.

Both sets of phosphate cured bellies were firmer and gave higher slicing yields than the control bellies without the phosphate. The sliced bacon from all 4 lots was evaluated from the standpoint of flavor, stability, and cooking characteristics and found satisfactory in all respects. Samples of sliced bacon from the 4 lots were submitted to chemical analysis, with the following results:

| Lot No. | Cure | Percent | | Nitrite, p.p.m. | Total phosphate as $P_2O_3$ | Added tripolyphosphate |
|---|---|---|---|---|---|---|
| | | Moisture | Salt | | | |
| 1 | I.N.A. (Control) | 25.4 | 1.23 | 40 | 0.18 | None |
| 2 | I.N.A. tripolyphosphate | 27.7 | 1.2 | 53 | 0.40 | 0.37 |
| 3 | I.N.A., I.N.B. cover (control) | 25.4 | 2.18 | 75 | 0.18 | None |
| 4 | I.N.A. and tripolyphosphate, I.N.B. cover | 27.8 | 1.86 | 75 | 0.33 | 0.25 |

EXAMPLE 4

Bacon bellies were phosphate cured by pumping 11% by weight with pickle formulated as follows, per 100 gallons of finished pickle:

25 lbs. sodium tripolyphosphate
30 lbs. brown sugar
134 lbs. sodium chloride
20 oz. sodium nitrite
36 oz. erythorbate A control lot of bellies was pumped 12% by weight with regular I.N.A. pickle, not containing phosphate.

Both lots were held for 2 hours and then smoked in an air-conditioned smokehouse according to the following schedule:

3 hours at 128° F.
3 hours at 135° F.
7 hours at 128° F.

An internal temperature of 126–128° F. was reached after 6 hours. Smoke was applied for 7 hours.

The smoked bellies were then chilled, formed, and sliced on a high speed slicing machine operating at 1200 r.p.m., with the following results:

| | Lot No. 1 | Lot No. 2 |
|---|---|---|
| | Cure | |
| | Phosphate | I.N.A. |
| Purpose | Test | Control |
| Yield from green to smoked, chilled weight | 98.74 | 98.50 |
| Slicing yield | 86.5 | 84.5 |

The sliced bacon from the above lots was packaged in 1 lb. cartons and used in conducting two separate consumer surveys, involving a total of 360 housewives. The surveys included an evaluation of the bacon from the standpoint of at least 10 specific product attributes, such as quality, flavor, color, separability of slices, spattering, shrinkage, etc. The results of the surveys indicated a 2 to 1 overall preference for the phosphate treated bacon as compared with the untreated bacon.

While in the foregoing specification this invention has been described in relation to preferred embodiments thereof, and many details have been set forth for the purpose of illustration, it will be apparent to those skilled in the art that many of the details set forth herein can be varied considerably without departing from the basic principles of the invention.

What is claimed is:

1. A process for preparing an improved bacon product comprising the steps of incorporating into green bacon bellies a curing pickle containing 1–10% of an edible polyphosphoric acid salt of an alkali metal, smoking and chilling the bacon bellies while controlling the moisture content therein so that the weight of the smoked and chilled bacon bellies is not in excess of 103% of their green weight, and slicing said bacon bellies with a high speed rotary slicing blade operating at a speed between 800–1400 revolutions per minute.

2. The process of claim 1 wherein said edible polyphosphoric acid salt is sodium tripolyphosphate.

3. The process of claim 1 wherein said edible polyphosphoric acid salt is sodium hexametaphosphate.

4. The process of claim 1 wherein said edible polyphosphoric acid salt is a mixture of sodium tripolyphosphate and sodium hexametaphosphate.

References Cited

UNITED STATES PATENTS

| | | | |
|---|---|---|---|
| 2,513,094 | 6/1950 | Hall | 99—159 |
| 2,688,556 | 9/1954 | Komarik et al. | 99—159 |
| 2,903,366 | 9/1959 | Barnett | 99—159 |
| 3,238,046 | 3/1966 | Komarik | 99—229X |

HYMAN LORD, Primary Examiner

U.S. CL. X.R.

99—229